Patented June 4, 1940

2,202,901

UNITED STATES PATENT OFFICE 2,202,901

TREATMENT OF CARBONACEOUS MATERIALS

Henry Dreyfus, London, England

No Drawing. Application December 24, 1937, Serial No. 181,714. In Great Britain January 6, 1937

4 Claims. (Cl. 196—32)

This invention relates to the treatment of carbonaceous materials.

According to the invention carbonaceous materials are treated with an alkali to remove sulphur therefrom and are subsequently hydrogenated.

The invention is of especial value in the treatment of normally liquid and easily liquefiable materials, for example naturally occurring oils and in particular products obtained from coal, for example low temperature tars and materials and compositions obtained by the solvent extraction of coal.

Coal extracts may be prepared in any suitable way. For example, the coal may be heated with a solvent such as a hydrocarbon, e. g., tetrahydronaphthalene, decahydronaphthalene, or with an organic base, e. g., pyridine or quinoline, or with a phenol or with mixtures of these or other organic compounds. If desired solvents of high boiling point may be used, for example solvents boiling above 250° C., and especially above 300° or even 350° C., e. g., anthracene oil fractions. It is immaterial whether the solvents are solids or liquids at ordinary temperatures.

The extraction may be carried out at any suitable temperature and especially at temperatures near to but below the decomposition temperature of the coal at any particular moment. As the decomposition temperature usually rises as the extraction proceeds, the temperature of the extraction may be correspondingly raised. Pressures higher than atmospheric may be employed and are, of course, necessary when the temperature used is above the normal boiling point of the solvent or of a constituent of the solvent; such pressures may be produced by means of a gas, e. g., hydrogen, or by means of the vapor of the solvent. The invention is not, however, restricted as regards the conditions under which the extraction takes place.

It is not necessary that the extraction be carried out to the highest possible degree. If desired it may be stopped after, for example, 50 or 60% of the coal has been extracted.

As the alkali in the new process it is preferable to use an alkali metal hydroxide. The alkali may be employed either in the solid form or in aqueous, aqueous-alcoholic, alcoholic, or other solution, and may be contacted with the carbonaceous material in any suitable way. Usually it is preferred to employ caustic soda rather than the other more expensive caustic alkalis.

It is usually preferable to employ the caustic soda or other alkali in the form of an aqueous solution. Such a solution may be relatively dilute or of moderate concentration or of fairly high concentration. For example the concentration of the solution may be 5%, 7%, 10%, 15%, 20%, 30%, or even 50%. Different concentrations may be employed when treating different types of carbonaceous material. For instance when a relatively viscous carbonaceous liquid is being treated it is often found that a concentrated caustic soda solution tends to form emulsions which are very difficult to break, and it may then be advisable to employ relatively dilute solutions. On the other hand, more concentrated solutions are usually more effective in removing the sulphur and when treating materials which do not so readily form emulsions it is usually of advantage to employ a relatively concentrated soda.

Other alkaline substances may be employed as well as or in place of the caustic soda. For example caustic potash may be used. This compound, although more expensive than caustic soda, is valuable when it is desired to employ an alcoholic solution instead of an aqueous solution. The solubility of caustic potash in relatively anhydrous ethyl alcohol is about three times that of caustic soda, and an alcoholic solution of caustic potash mixes very readily with most liquid carbonaceous materials and is a very effective de-sulphurising agent. Ammonia may also be employed if desired, with the advantage that if anhydrous ammonia is bubbled through a liquid carbonaceous material there is no possibility of an aqueous emulsion forming. Generally, however, it is preferred to employ caustic soda as this agent is not only cheap but provides a very efficient means of removing sulphur.

The treatment with the alkali may be carried out under a relatively wide range of temperature and pressure. For example it may be carried out at room temperature or higher temperatures, for example temperatures of about 20°, 30°, 50° C. or higher and under atmospheric pressure or higher pressures. Usually it is simpler to employ atmospheric pressure and a relatively low temperature, but if desired temperatures of the order of 150° C. or more and relatively high pressures, for example 5 or 10 atmospheres or more, may be employed.

It is important that the alkali and the carbonaceous material are brought into intimate contact, while avoiding such violent agitation as will, in any particular case, result in the formation of a stable emulsion. For example the carbonaceous materials may be forced into a vessel containing an aqueous solution of caustic soda, or a caustic soda solution and carbonaceous material may be caused to flow in counter-current through a bubble tower or through a tube provided with perforated baffles, or through some other type of apparatus which will ensure a good contact between the alkali and the carbonaceous material. Another method, which is particularly useful when the viscosity of the carbonaceous materials and the tendency to emulsification are relatively low, consists in mixing the material and alkali solution in a vessel, and passing or forcing bubbles of an inert gas, e. g., nitrogen, or of air or some other gas through the mixture. A modification of such process consists in blowing air through carbonaceous material containing both caustic alkali and a catalyst, for example lead sulphide, cadmium sulphide, zinc sulphide, clay, barium sulphate, or even small quantities of elementary sulphur.

If the carbonaceous material is volatile it may be vaporized before being brought into contact with the alkali, and the latter may be either in the form of a solution or in the solid state. For example in one method of working with relatively volatile carbonaceous material a spray of a solution of an alkali may be injected into a vaporized carbonaceous material.

The carbonaceous material may be subjected to a single treatment with the alkali or to two or more treatments, and the reaction conditions, e. g. the nature and concentration of the alkali, the temperature and the pressure, may be the same or different in different stages of a multistage process. For example the materials may be subjected to two or more relatively short treatments with an aqueous caustic soda solution. A di- or multi-stage treatment may be carried out in a counter-current system. For example in a four stage treatment the last stage may be effected with a relatively pure caustic soda solution, which may then be employed in the third stage of the treatment of another batch of the material and so on.

If desired between the treatment with alkali and the hydrogenation, a further treatment to remove residual sulphur may be employed. For example the carbonaceous material, preferably after being watched free from alkali, may be heated with a metal which is capable of combining with sulphur or with a suitable compound of such a metal. For example it may be heated with oxides of copper, iron, lead, manganese, zinc or antimony, and especially with freshly precipitated copper oxides or iron oxides. These substances may be employed in association with a carrier, for example silica gel or charcoal, by which means it is possible to improve the contact between the metal or metal compound and the carbonaceous material being treated. Not only may the carbonaceous material be heated or boiled in the presence of these metals or compounds but if volatile, it may be vaporized and passed through or over them. Any other method of removing sulphur may be employed if desired, following the alkali treatment or the treatment with a suitable metal or metal compound as set out above.

The hydrogenation of the treated carbonaceous materials may with advantage be carried out in the presence of nickel in amount exceeding the equivalent of any sulphur remaining in the materials. Thus the materials may be heated to a temperature of 200°–400° C. or more with hydrogen in the presence of nickel, preferably under a relatively high pressure, for example a pressure of 10, 20, 50 atmospheres or more. The carbonaceous material may be in the solid, liquid or vapor phase according to its nature and the temperature and pressure employed. The quantity of nickel may, for example, be twice, four times or eight times the equivalent of the sulphur remaining in the materials but other proportions may be employed if desired.

The nickel catalyst may advantageously be made by first forming nickel oxide in any convenient way and then reducing the oxide to nickel under the hydrogenating conditions but in the absence of the carbonaceous material. The nickel may be, for example, in the form of powder produced from nickel formate or in the form of small chips or grindings. Such finely divided nickel may with advantage be deposited on a carrier, such for example as silica gel, charcoal or alumina. Very good results are obtained, however, when larger pieces of nickel are employed, for example nickel turnings or borings or other nickel scrap. In such a case the nickel may be contained in a perforated cage through which fluid carbonaceous material can readily pass. For example such a cage may fit relatively tightly in the hydrogenating vessel so as to ensure the passage of all the carbonaceous material through the nickel, or two or more cages may be employed, either to provide alternative paths for the carbonaceous material or arranged so that the material goes first through one and then through another. Cages may also be employed when a batch process which does not involve flow of the carbonaceous material is used.

If desired, the treatment with hydrogen in the presence of nickel which has just been described may be followed by a further hydrogenation step in the presence of nickel or in the presence of some other hydrogenating catalyst, for example a compound of tungsten or preferably of molybdenum. The carbonaceous material may be in the solid, liquid or vapor phase, irrespective of the phase in which the carbonaceous material was employed in the first hydrogenation step; thus the volatility of the material may be increased in the first hydrogenation step sufficiently to enable it to be employed in the vapor phase in the second step. If desired a third hydrogenation step may also be employed to produce compounds of still lower molecular weight.

The spent nickel catalyst may be regenerated and used afresh in the process. For example it may be heated in the presence of air or oxygen and then reduced as already described. Moreover, it may, if desired, be treated with nitric acid in order to form nickel nitrate which can readily be decomposed to the oxide. Any other suitable method of regeneration may be employed, for example heating with organic acids, e. g., acetic acid, to drive off hydrogen sulphide.

The nickel employed in the first hydrogenation step described may be partly or wholly replaced by other hydrogenating catalysts, for example molybdenum or tungsten compounds. Thus there may be added to the carbonaceous material molybdenum oxide or ammonium molybdate which tend to react with sulphur to form molybdenum sulphide. On the other hand a simple molybdenum sulphide may be employed which will react with sulphur to produce a polysulphide. Such catalysts have the advantage that they are extremely resistant to sulphur poisoning.

The following examples illustrate the invention without limiting it at all.

Example 1

A bituminous coal of high volatile content is powdered and extracted under pressure and at a temperature rising from about 250° to 350° C. with decahydronaphthalene, or a mixture of hydrogenated naphthalene, containing about 10% of its weight of pyridine. The extract is caused to flow through a series of towers, provided with perforated baffle plates or similar devices, in countercurrent to a 20% aqueous caustic soda solution, both fluids being at room temperature and atmospheric pressure. The extract is then washed with water until it is substantially free from alkali. It may then be heated to about 80° C. with freshly precipitated copper oxide or iron oxide; if desired, however, this step may be omitted and the extract, preferably after removal of the pyridine and part of the hydrogenated naphthalene for re-use, subjected to hydrogenation. To effect this the extract, heated to 350° C. under a hydrogen pressure of 100 atmospheres, is caused to flow slowly in contact with a large quantity of nickel, produced by reducing nickel oxide, and contained in a series of perforated cages. A second hydrogenation may be applied, according to the nature of the products desired.

Example 2

A coal extract is washed thoroughly with aqueous caustic soda as described in Example 1. Part of the extractant is then removed by distillation, and molybdenum sulphide or ammonium molybdate is mixed intimately with the material remaining. The material is then heated to 370° C. under a hydrogen pressure of 80 atmospheres. A second hydrogenation stage under similar conditions may be employed if desired.

The materials and compositions obtained by the solvent extraction of coal are for convenience and brevity hereinafter in the claims referred to as "coal extracts", which term is to be understood as including any material or composition obtained by the solvent extraction of coal, whether or not it contains solvent used for the extraction.

Having described my invention, what I desire to secure by Letters Patent is:

1. Process for obtaining valuable organic compounds from coal extracts which comprises washing said extracts, to remove sulphur therefrom, with a solution of an alkali at a temperature below the boiling point of said solution under the pressure obtaining, and thereafter subjecting them to catalytic hydrogenation in presence of an amount of nickel exceeding the equivalent of any sulphur present.

2. Process for obtaining valuable organic compounds from coal extracts which comprises washing said extracts, to remove sulphur therefrom, with a solution of an alkali at a temperature below the boiling point of said solution under the pressure obtaining, thereafter heating said extracts with a substance selected from the group consisting of metals and metal compounds capable of combining with sulphur, and finally subjecting them to catalytic hydrogenation.

3. Process for obtaining valuable organic compounds from coal extracts which comprises washing said extracts, to remove sulphur therefrom, with a solution of an alkali at a temperature below the boiling point of said solution under the pressure obtaining, thereafter heating said extracts with an oxide of iron and finally subjecting them to catalytic hydrogenation.

4. Process for obtaining valuable organic compounds from coal extracts which comprises washing said extracts, to remove sulphur therefrom, with a solution of caustic soda at a temperature below the boiling point of said solution under the pressure obtaining, thereafter heating said extracts with a substance selected from the group consisting of metals and metal compounds, capable of combining with sulphur, and finally subjecting them to catalytic hydrogenation.

HENRY DREYFUS.